May 19, 1925.　　　　　　　　　　　　　1,538,253
J. J. MATZ
SUMP NET
Filed Oct. 22, 1924　　2 Sheets-Sheet 2

INVENTOR
John J. Matz
BY
John W. Maupin.
ATTORNEY

Patented May 19, 1925.

1,538,253

UNITED STATES PATENT OFFICE.

JOHN J. MATZ, OF KETCHIKAN, TERRITORY OF ALASKA.

SUMP NET.

Application filed October 22, 1924. Serial No. 745,225.

*To all whom it may concern:*

Be it known that I, JOHN J. MATZ, a citizen of the United States, residing at Ketchikan, in the Territory of Alaska, have invented a certain new and useful Improvement in Sump Nets, of which the following is a specification.

My invention relates to sump nets and is adapted for use as a unit in itself or in combination with stationary or floating fish traps.

The principal objects of the invention are to provide a sump net whereby fish may be readily transferred from a fish trap captivity chamber or "heart," or directly from the open water, into a pound net or other receptacle.

The primary advantage in this arrangement is that the heart is prevented from getting congested and ample room is continually provided for the incoming fish, thus resulting in the catching of a relatively larger percentage of fish.

With the above and other objects in view which will appear as the description proceeds, the invention consists of the novel construction, adaptation, arrangement and combination of parts hereinafter described and claimed. These objects are accomplished by devices illustrated in the accompanying drawings, wherein:—

Figure 1:
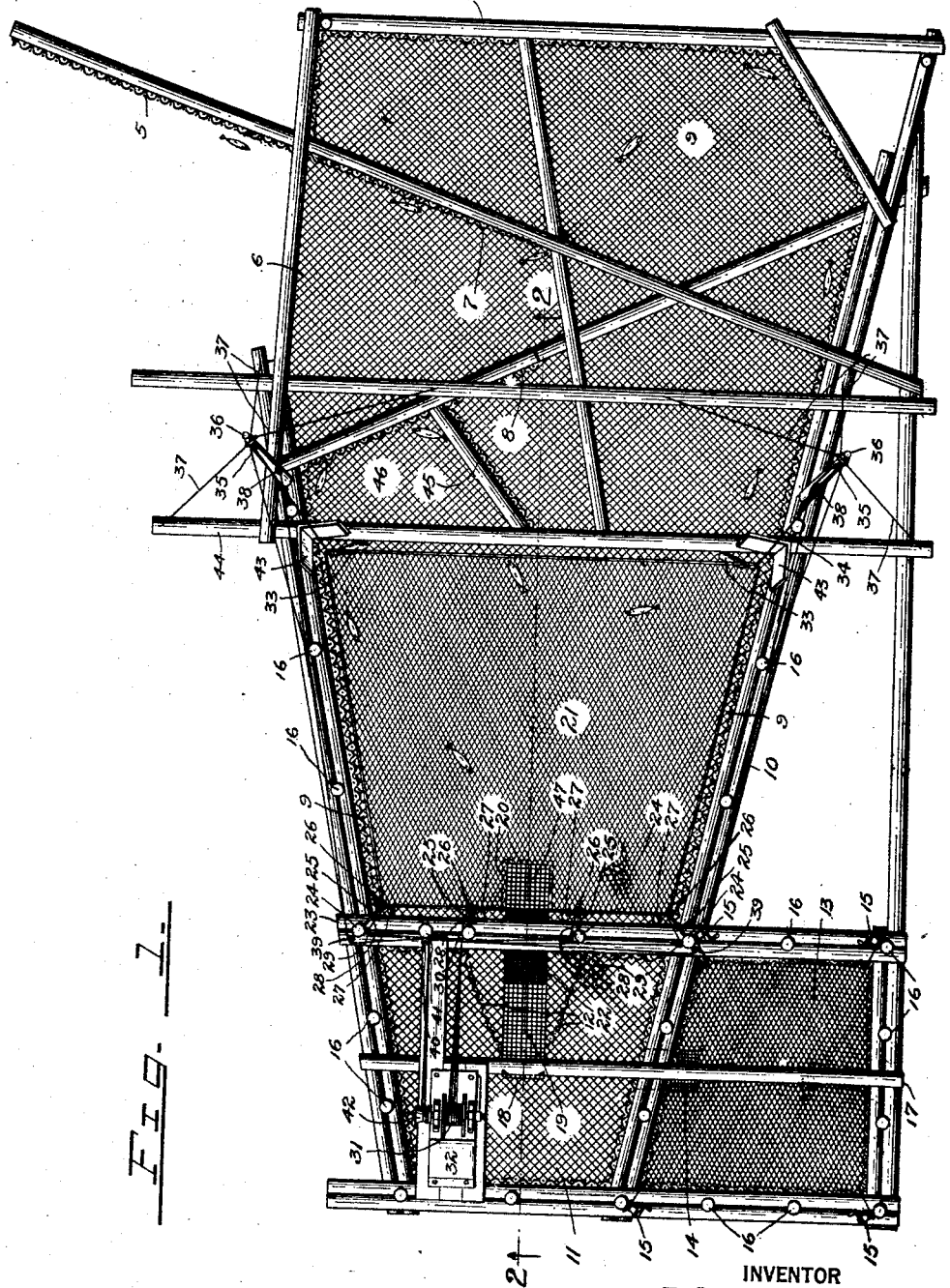
Figure 2:
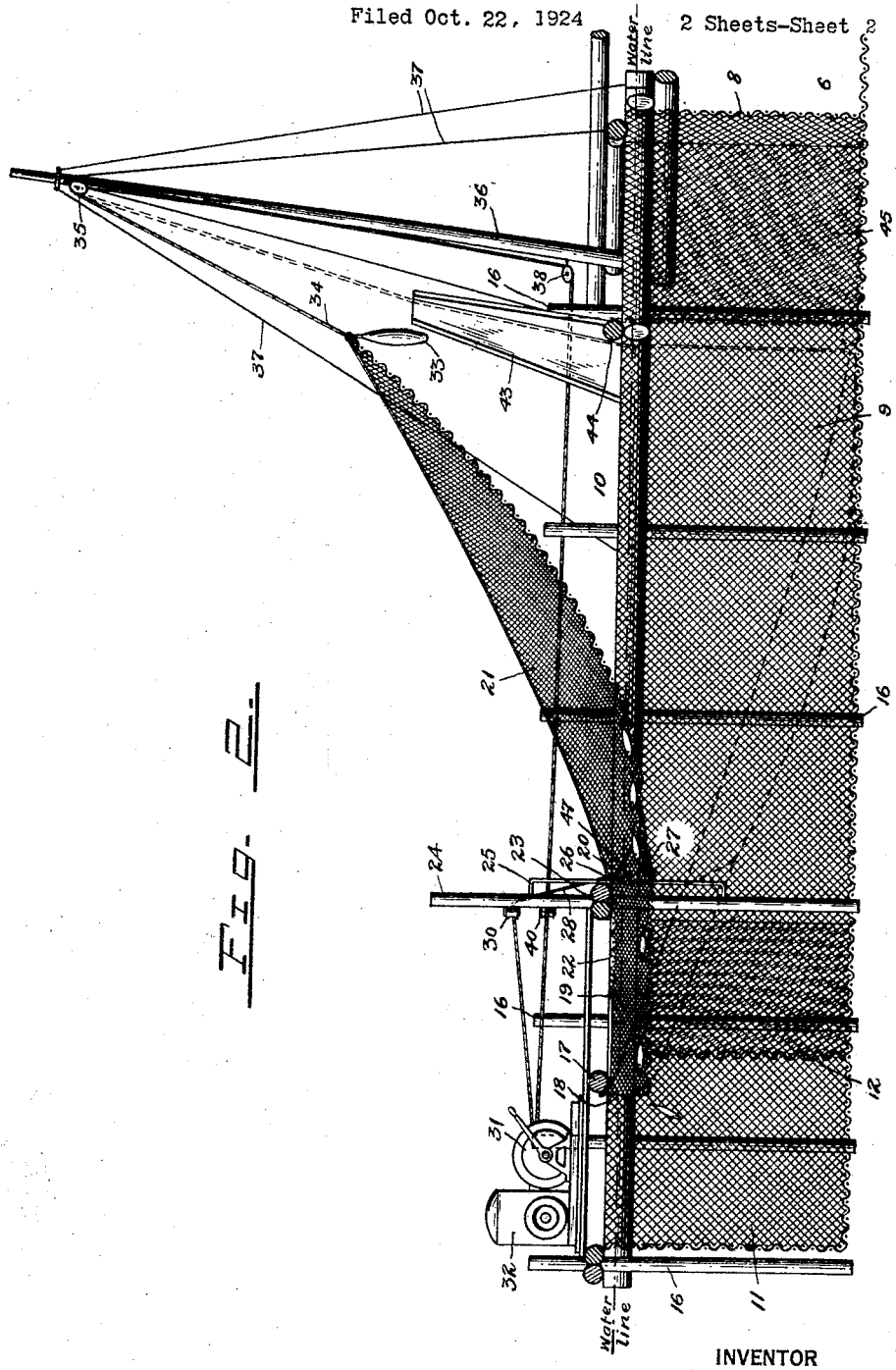

Figure 1 is a top plan view of a floating fish trap showing my sump net secured thereto in the normal or lowered position; and Fig. 2 is a fragmentary view in longitudinal vertical section, taken substantially on a broken line 2, 2 of Fig. 1, and showing the sump net in a raised position in the act of impounding fish, and also showing same in the lowered position in dotted lines.

Referring to the drawings throughout which like reference numerals designate like parts, the numeral 5 indicates a lead where the fish enter through a gate 6 between wings 7 and 8 into the heart 9 of a floating fish trap designated as a whole by the numeral 10. Said fish trap comprises a framework of logs secured by cross braces to form a float for securing the sides of the net heart and for other purposes more fully hereinafter set forth.

A pot or pound net 11 adjoins the forward end of the heart 9 and an entrance from the latter into the former is ordinarily established by means of a tunnel comprising convergent wings 12. A spiller net 13 is provided adjacent one side of said pot and a chute 14 permits the fish to pass freely from the pot to the spiller where they are brailed out into boats by means of hand winches 15 in raising the sides of said spiller net. Vertical piles 16 depending from the trap frame are employed to prevent the tidal current from sagging the sides of the heart, pot and spiller as is well understood.

Thus far the description has introduced no novel features or new elements of construction and it will be understood that I make no claim regarding the fish trap as such except in so far as it forms a new and useful combination with my device together with the cooperative details that serve to make the combination a practical unit in itself.

In the adaptation of my sump net to the fish trap shown in the drawings, a brace 17 is secured transversely of the trap framework and substantially midway of the pot and spiller nets. The discharge end 18 of a chute 19 is secured to said brace, while its inner end 20 is secured to the forward end of the body portion 21 of the sump net proper. Said chute is provided with a cover portion 22 extending substantially half its length from the forward edge of said sump net.

A reenforced brace 23 is fastened transversely of the framework at the juncture of the heart 9 and pot 11 and a plurality of upright piles 24 is secured therethrough in spaced relation. Bracket rods 25 are secured to said piles and a plurality of rings or other suitable devices 26 secured to the forward edge of the sump net 21 is arranged to slide up and down on said rods.

Weights 27 are secured to the rings 26 and lines 28 secured to said rings pass upwardly through pulleys or other guides 29 secured to the piles 24. Said lines collectively pass through a fairleader or shive 30, secured to one of the said piles, and thence to the drum 31 of a hoisting engine 32 mounted on a platform fastened to the framework of the trap.

The after end of the sump net 21 is provided at its outer corners with weights 33. Lines 34 secured to said corners pass upwardly to shives or blocks 35 secured to the upper portions of masts 36. Said masts are mounted on the framework of the fish trap and are provided with suitable guy lines 37 secured to said framework.

From the shives 35 the lines 34 pass downwardly to shives or blocks 38 on the masts 36, thence to shives 39 on the outer piles 34, thence to a fairleader 40 on a pile 41 mounted on the brace 23, and then collectively to a winch head 42 on the engine 32. Upright guides or troughs 43 are secured to the trap framework in the corners where a cross brace 44 is secured to the side members thereof and serve to prevent the weights 33 from fouling or catching on any part of the trap in their upward and downward movement.

An auxiliary wing 45 projects outwardly in a diagonal direction from the gate wing 8 and forms a pocket 46 in connection with said gate wing and one side of the heart 9. It will be noted that the inner ends of the three wings 7, 8 and 45 are all disposed in single alignment with respect to the longitudinal axis of the trap. This arrangement is calculated to confuse the fish in their passage back and forth within the heart 9 causing them to pass by the opening between the wings 7 and 8 and thus tends to prevent their escape from the trap.

In Fig. 1 of the drawings the sump net 21 is shown in its normal or lowered position, and likewise in dotted lines in Fig. 2. Referring to Fig. 1, the natural path of the fish into the trap is indicated by a series of miniature figures. Upon reaching the pocket 46 the wing 45 will cause the fish to pursue a circuitous path in the aggregate directly above the sump net 21.

When it has been ascertained that a sufficient number of fish are within the range of the sump net 21 same is raised by means of the hoisting engine 32. The forward end of said net is drawn up snugly against the transverse brace 23 and the after end is raised to the position shown in Fig. 2. It is obvious that the weights 33 will prevent excessive sagging of the after end of the sump net.

The position of the water line is indicated by a dot and dash line in Fig. 2. While the after end of the net 21 is being raised the weight of the fish will cause said net to sag in its middle portion. Gravity and the natural instinct of the fish to seek the water will cause them to be projected toward the inner or throat end 20 and to pass through the chute 19 as clearly shown in Fig. 2 of the drawings.

The net 21 is finally drawn entirely above the water and as the chute 19 is continually below the water line a pool of open water will always be visibly accessible within the throat 20 and the last of the fish will instinctively pass into said pool and through said chute to be impounded within the pot 11. As I consider this pool of water surrounded by the throat of the chute to be one of the most important features of my invention I have called it the sump portion, as designated by the numeral 47, and I have therefore entitled my invention a "sump net."

It will now be apparent that I have provided an effective means of entrapping fish that will materially accelerate and facilitate the work of catching fish regardless of the number, and will keep the heart free from congestion and provide ample room for the incoming fish at all times.

While I have shown my invention as applied to a floating fish trap it will be expressly understood that same may be used in connection with a stationary trap or any other type of trap to which it is adaptable, and it may be used as a unit in itself if so desired. The masts 36 may be mounted on separate floats or driven into the ground, and the chute 19 may lead to any convenient depository.

From the foregoing description taken in connection with the accompanying drawings, the construction and operation of my device will be readily apparent, and, while I have described the invention with considerable particularity, it will be understood that I intend no limitations within its scope and spirit except in so far as are imposed by the appended claims.

Having thus described my invention what I claim and desire to secure by Letters Patent of the United States is:—

1. A sump net comprising a body portion, means for independently raising and lowering the forward and after ends of said body portion, a chute leading from said body, and a sump portion at the juncture of said chute and body disposed continually below the water level when the net is in operation substantially as described.

2. A sump net comprising a body portion, means for independently raising and lowering the forward and after ends of said body portion, weights for said forward and after ends, guides for the weights, a chute leading from said body, and a sump portion at the juncture of said chute and body continually disposed below the water level when the net is in operation substantially as specified.

3. A sump net comprising a body portion, a chute leading from said body, a sump portion at the juncture of said chute and body, a brace above said juncture, means for raising the forward end of said body against said brace, said sump portion continually disposed below the water level in its operative position, weights for lowering said forward end, means for raising the after end of said body net portion, weights for said after end, and guides for said weights as specified.

4. The combination with a fish trap, of a sump net comprising a body portion, a chute leading from said body to a pot, a sump portion at the juncture of said chute and body, a transverse brace above said juncture, means for raising the forward end of said body in snug abutment with said brace, said sump portion continually disposed below the water level when the net is in operation, weights for said forward end, means for raising the after end of said body, masts for said means, weights for said after end, and guides for said weights substantially as set forth.

5. The combination with a fish trap, of a sump net comprising a body portion, means for raising and lowering the forward and after ends of said body, masts for said means, a chute leading from said body to a pot, a sump portion at the juncture of said chute and body continuously disposed below the water level in the operative position, a gate comprising complementary wings for the trap, an auxiliary wing projecting from one of said complementary wings to form a pocket adjacent the after end of said body net portion, and the inner ends of the three said wings disposed in alignment substantially as specified.

In witness whereof, I hereunto subscribe my name this 15th day of October A. D. 1924.

JOHN J. MATZ.